(12) United States Patent  
Chandrasekar et al.

(10) Patent No.: US 7,840,609 B2  
(45) Date of Patent: Nov. 23, 2010

(54) USING SIBLING-COUNT IN XML INDEXES TO OPTIMIZE SINGLE-PATH QUERIES

(75) Inventors: Sivasankaran Chandrasekar, Palo Alto, CA (US); Ravi Murthy, Fremont, CA (US); Thomas Baby, Foster City, CA (US); Nipun Agarwal, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 535 days.

(21) Appl. No.: 11/888,415

(22) Filed: Jul. 31, 2007

(65) Prior Publication Data

US 2009/0037369 A1 Feb. 5, 2009

(51) Int. Cl.
*G06F 7/00* (2006.01)

(52) U.S. Cl. ...................................... 707/804
(58) Field of Classification Search ........................ None
See application file for complete search history.

(56) References Cited

U.S. PATENT DOCUMENTS 5,193,533 A 3/1993 Body et al.

(Continued)

FOREIGN PATENT DOCUMENTS

WO    WO 01/42881 A2    6/2001

(Continued)

OTHER PUBLICATIONS

Lo et al., XAS: A System for Accessing Componentized, Virtual XML Documents, May 2001, Proceedings of ICSE'01, IEEE Press, p. 493-502, <Retrieved from IEEE Explore May 4, 2009>.

(Continued)

*Primary Examiner*—Neveen Abel Jalil  
*Assistant Examiner*—Kellye D Buckingham  
(74) *Attorney, Agent, or Firm*—Hickman Palermo Truong & Becker LLP

(57) ABSTRACT

A method and apparatus are provided for using sibling-counts in XML indices to optimize single-path queries. Using a b-tree XML index with a SQL query logarithmically reduces the number of disk accesses by passing over index entries where it is determined that a match will not be found. However, because certain index entries are passed over, it is impossible to ascertain if a path expression occurs more than once in the XML index, as certain queries sometimes require. This hurdle can be overcome by maintaining a sibling count with each node entry in the XML index. Because the sibling count is stored with the index entry, the index will reveal whether the matching node is single or has other siblings. In additional to re-writing the original query for optimization by use of an XML index, it will be re-written to check for a single-path condition in the index.

18 Claims, 4 Drawing Sheets

U.S. PATENT DOCUMENTS

| | | |
|---|---|---|
| 5,210,686 A | 5/1993 | Jernigan |
| 5,369,763 A | 11/1994 | Biles |
| 5,404,513 A | 4/1995 | Powers et al. |
| 5,410,691 A | 4/1995 | Taylor |
| 5,454,101 A | 9/1995 | Mackay et al. |
| 5,467,471 A | 11/1995 | Bader |
| 5,514,112 A | 5/1996 | Chu et al. |
| 5,524,240 A | 6/1996 | Barbara et al. |
| 5,530,849 A | 6/1996 | Hanushevsky et al. |
| 5,544,360 A | 8/1996 | Lewak et al. |
| 5,546,571 A | 8/1996 | Shan et al. |
| 5,568,640 A | 10/1996 | Nishiyama et al. |
| 5,643,633 A | 7/1997 | Telford et al. |
| 5,680,614 A | 10/1997 | Bakuya et al. |
| 5,701,467 A | 12/1997 | Freeston |
| 5,795,322 A | 8/1998 | Boudewijn |
| 5,838,965 A | 11/1998 | Kavanagh et al. |
| 5,842,212 A | 11/1998 | Balluvio et al. |
| 5,870,590 A | 2/1999 | Kita et al. |
| 5,878,415 A | 3/1999 | Olds |
| 5,917,492 A | 6/1999 | Bereiter et al. |
| 5,921,582 A | 7/1999 | Gusack |
| 5,964,407 A | 10/1999 | Sandkleiva |
| 5,974,407 A | 10/1999 | Sacks |
| 5,987,506 A | 11/1999 | Carter et al. |
| 6,038,563 A | 3/2000 | Bapat et al. |
| 6,055,544 A | 4/2000 | DeRose et al. |
| 6,061,684 A | 5/2000 | Glasser et al. |
| 6,101,500 A | 8/2000 | Lau |
| 6,111,578 A | 8/2000 | Tesler |
| 6,112,209 A | 8/2000 | Gusack |
| 6,128,610 A | 10/2000 | Srinivasan et al. |
| 6,141,655 A | 10/2000 | Johnson et al. |
| 6,154,741 A | 11/2000 | Feldman |
| 6,182,121 B1 | 1/2001 | Wlaschin |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmone |
| 6,236,988 B1 | 5/2001 | Aldred |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,279,007 B1 | 8/2001 | Uppala |
| 6,298,349 B1 | 10/2001 | Toyoshima et al. |
| 6,330,573 B1 | 12/2001 | Salisbury et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,427,123 B1 | 7/2002 | Sedlar |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,539,398 B1 | 3/2003 | Hannan et al. |
| 6,604,100 B1 | 8/2003 | Fernandez et al. |
| 6,609,121 B1 | 8/2003 | Ambrosini et al. |
| 6,636,845 B2 | 10/2003 | Chau et al. |
| 6,643,633 B2 | 11/2003 | Chau et al. |
| 6,684,227 B2 | 1/2004 | Duxbury |
| 6,697,805 B1 | 2/2004 | Choquier et al. |
| 6,708,186 B1 | 3/2004 | Claborn et al. |
| 6,725,212 B2 | 4/2004 | Couch et al. |
| 6,772,350 B1 | 8/2004 | Belani et al. |
| 6,785,673 B1 | 8/2004 | Fernandez et al. |
| 6,826,727 B1 | 11/2004 | Mohr et al. |
| 6,836,857 B2 | 12/2004 | Ten-Hove et al. |
| 6,920,457 B2 | 7/2005 | Pressmar |
| 7,043,488 B1 | 5/2006 | Bauer et al. |
| 7,047,253 B1 | 5/2006 | Murthy et al. |
| 7,089,239 B1 | 8/2006 | Baer et al. |
| 7,097,653 B2 | 8/2006 | Freudenthal et al. |
| 7,107,282 B1 | 9/2006 | Yalamanchi |
| 7,120,645 B2 * | 10/2006 | Manikutty et al. ............... 1/1 |
| 7,139,746 B2 | 11/2006 | Shin et al. |
| 7,162,485 B2 | 1/2007 | Gottlob et al. |
| 7,171,404 B2 * | 1/2007 | Lindblad et al. ............... 707/3 |
| 7,171,407 B2 | 1/2007 | Barton et al. |
| 7,216,127 B2 | 5/2007 | Auerbach |
| 2001/0037345 A1 | 11/2001 | Kiernan et al. |
| 2001/0049675 A1 | 12/2001 | Mandler et al. |
| 2002/0078068 A1 | 6/2002 | Krishnaprasad et al. |
| 2002/0103829 A1 | 8/2002 | Manning et al. |
| 2002/0143512 A1 | 10/2002 | Shamoto et al. |
| 2002/0152267 A1 | 10/2002 | Lennon |
| 2002/0156811 A1 | 10/2002 | Krupa |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2003/0009361 A1 | 1/2003 | Hancock et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101194 A1 | 5/2003 | Rys et al. |
| 2003/0131051 A1 | 7/2003 | Lection et al. |
| 2003/0140308 A1 | 7/2003 | Murthy et al. |
| 2003/0177341 A1 | 9/2003 | Devillers |
| 2003/0182624 A1 | 9/2003 | Large |
| 2003/0212662 A1 | 11/2003 | Shin et al. |
| 2003/0212664 A1 | 11/2003 | Breining et al. |
| 2004/0010752 A1 | 1/2004 | Chan et al. |
| 2004/0044659 A1 | 3/2004 | Judd et al. |
| 2004/0064466 A1 * | 4/2004 | Manikutty et al. .......... 707/100 |
| 2004/0068494 A1 | 4/2004 | Tozawa et al. |
| 2004/0088320 A1 | 5/2004 | Perry |
| 2004/0088415 A1 | 5/2004 | Chandrasekar et al. |
| 2004/0167864 A1 | 8/2004 | Wang et al. |
| 2004/0205551 A1 | 10/2004 | Santos |
| 2004/0230667 A1 | 11/2004 | Wookey |
| 2005/0038688 A1 | 2/2005 | Collins et al. |
| 2005/0050016 A1 | 3/2005 | Stanoi et al. |
| 2005/0091188 A1 * | 4/2005 | Pal et al. ..................... 707/1 |
| 2005/0097084 A1 * | 5/2005 | Balmin et al. ................ 707/3 |
| 2005/0120031 A1 | 6/2005 | Ishii |
| 2005/0228792 A1 | 10/2005 | Chandrasekaran et al. |
| 2005/0228818 A1 | 10/2005 | Murthy et al. |
| 2005/0229158 A1 * | 10/2005 | Thusoo et al. ............. 717/115 |
| 2005/0257201 A1 | 11/2005 | Rose et al. |
| 2006/0235840 A1 * | 10/2006 | Manikutty et al. ............. 707/4 |

FOREIGN PATENT DOCUMENTS

| | | |
|---|---|---|
| WO | WO 01/59602 A1 | 8/2001 |
| WO | WO 01/61566 A1 | 8/2001 |
| WO | WO 03/027908 A2 | 4/2003 |

OTHER PUBLICATIONS

Meyer et al, "GenDBDan open source genome annotation system for prokaryote genomes", Apr. 2003, Nucleic Acids Research, p. 2187-2195.

Shah et al, "Pegasys: software for executing and integrating analyses of biological sequences", Apr. 2004, BMC Bioinformatics, p. 1-16, <Retrieved from BioMed Central, May 4, 2009>.

Mungall et al, "An integrated computational pipeline and database to support whole-genome sequence annotation", Dec. 2002, GenomeBiology.com p.1-11, <Retrieved from GenomeBiology May 4, 2002>.

Chen et al., "From Tree Patterns to Generalized Tree Patterns: On Efficient Evaluation of XQuery, 2003", Proceedings of the 29th VLDB Conference, pp. 1-12.

Girardot et al., "Millau: an encoding format for efficient representation and exchange of XMLover the Web", IBM Almaden Research Center, 24 pages.

Shankar Pal et al., "Indexing XML Data Stored in a Relational Database", Proceedings of the 30th VLDB Conference, 2004, 12 pages.
MacKenzie et al., "Finding Files", FindUtils, Version 4.1.2, Source Code, GNU.org, Nov. 1997, source files, code. C, 22 pages.
Cormen et al., "Introduction to Algorithms", MIT Press, 2001, 2nd Edition, 4 pages.
European Patent Office, "Communication pursuant to Article 94 (3) EPC", European patent application 05732473.3-1225, dated Feb. 4, 2008, 7 pages.
State Intellectual Property Office of P.R.C., "Notification of the First Office Action", European patent application 2005800186273.9, dated Oct. 12, 2007, 9 pages.
Claims, European patent application 2005800186273.9, 3 pages.
Claims, European patent application 05732473.3-1225, 3 pages.
Claims, Foreign Application No. 200580018627.9 (50277-3171), 3 pages.
State Intellectual Property Office of P.R.C., "Notification of the First Office Action", Foreign Application No. 200580018627.9 (50277-3171), mailed Oct. 12, 2007, 9 pages.
International Searching Authority, "Notification of Transmittal of the International Search Report and the Written Opinion of the International Searching Authority, or the Declaration," PCT/US2005/021259, dated Nov. 24, 2005, 13 pages.
Current Claims, PCT/US2005/021259, 15 pages.
Choi, Byron et al., "The XQuey Formal Semantics: A Foundation for Implementation Optimization," May 31, 2002, IEEE XP-002353605, 15 pages.
Vorthmann, S. et al. "Beyond Schemas, Schema Adjuncts and the Outside World," Markup Languages, Online!, vol. 2, No. 3, Jun. 2000, pp. 1-8.
Kang, Ji-Hoon et al., "An XQuery Engine for Digital Library Systems that support XML data," Proceedings of the 2004 International Symposium on Application and the Internet Workshops, IEEE XP-0010684128, 5 pages.
Murthy, Ravi et al., "XML Schemas in Oracle XML DB," Proceedings of the 29th VLDB Conference, 2003, IEEE XP-002353604, pp. 1009-1018.
Shanmugasundaram, Jayavel, et al., "Querying XML Views of Relational Data," Proceedings of the 27th Very Large Databases Conference, Rome, Italy, Sep. 2001, pp. 261-270.
Zhang, Hui et al., "XQuery rewriting at the relational algebra level," Computer Systems Science and Engineering, vol. 18, No. 5, Sep. 2003, IEEE XP-009056809, pp. 241-262.
Zhang, Xin et al., "Honey, I Shrunk the XQuery!—An XML Algebra Optimization Approach," Submission for WIDM'02, IEEE XP-002316448, 14 pages.
Josephin Cheng, et al., "IBM DB2 XML Extender, An end-to-end solution for storing and retrieving XML documents," IEEE, ICDE '00 Conference, San Diego, Feb. 2000, 128 pages.
Jim Melton, "ISO-ANSI Working Draft, XML-Related Specifications (SQL/XML)," WG3: DRS-020, H2-2002-365, Aug. 2002, 154 pages.
Oracle Corporation, "Oracle9iXML Database Developer's Guide—Oracle XML DB," Release 2 (9.2), Mar. 2002, Part No. A96620-1, 64 pages.
W3C, "XML Schema Part 1: Structures," W3C Recommendation, May 2, 2001, retrieved from website: http://www.w3.org/TR/2001/REC-xmlschema-1-20010502/, 94 pages.
W3C, "XML Schema Part 2: Datatypes," W3C Recommendation, May 2, 2001, retrieved from website: http://www.w3.org/TR/2001/REC-xmlschema-2-20010502/, 102 pages.
R. Bourret et al.: A generic Load/Extract Utility for Data Transfer Between XML Documents and Relational Databases, Jun. 8-9, 2000, IEEE computing SOC., pp. 134-143.
Dayen, I., "Storing XML in Relational Databases", XML.com XP-002275971(1998-2004) pp. 1-13.
Funderbunk, J. et al., "XML programming with SQL/XML and XQuery", IBM Systems Journal XP-002295973 (2002) pp. 642-665. Hierarchical Queries, XP-002295972, pp. 8-3 to 8-7.
PCT/US2004/010018—International Search Report and Written Opinion, received Nov. 5, 2004, 14 pages.
PCT/US2004/010018—current claims.

Peng, Feng et al., "Xpath queries on streaming data", 2003, ACM Press, pp. 432-442.
Jean-Yes Vio-Dury, "Xpath on left and right sides of rules: toward compact XML tree rewriting through node patterns", 2003, ACM Press, pp. 19-25.
MacKenzie, David et al., "Finding Files", GNU Findutils Version 4.1.2, Nov. 1994, 38 pages.
European Patent Office, "Communication Pursuant to Article 96(2) EPC," EP App. No. 02799692.5, dated Jan. 18, 2006, 5 pages.
Current Claims PCT/US02/31168, EP App. No. 02799692.5, 8 pages.
Lo et al., "XAS: A System for Accessing Componentized, Virtual XML Documents," IEEE, 2001, pp. 493-502.
Zisman et al., "Using XML to Build Consistency Rules for Distributed Specifications," Proceedings of the Tenth International Workshop on Software Specification and Design (IWSD'00), IEEE 2000, 8 pages.
Myllymaki, Jussi, "Effective Wed data Extraction with Standard XML Technologies," WWW10, May 1-5, 2001, pp. 689-696.
Schmidt et al., "Why and How to Benchmark XML Databases," SIGMOND Record, vol. 3, No. 3, Sep. 2001, pp. 27-32.
McHugh, Jason et al., "Query Optimization for XML", XP-002333353, Proceedings of the 25th VLDB Conference (1999) pp. 315-326.
Yoshikawa, Masatoshi et al., "XRel: A Path-Based Approach to Storage and Retrieval of XML Documents Using Relational Databases", XP-001143686, ACM Transactions on Internet Technology (2001), pp. 110-141.
European Patent Office, "Notification of Transmittal of the International Search Report and the Written Opinion of the International Searching Authority, or the Declaration", dated Jul. 29, 2005, received from International application No. PCT/US2005/011762.
Pending claims from International application No. PCT/US2005/011762.
International Preliminary Examining Authority, "Notification of Transmittal of the International Preliminary Report of Patentability," PCT/US2005/020795, dated Aug. 7, 2006, 10 pages.
International Preliminary Examining Authority, "Written Opinion of the International Preliminary Examining Authority," PCT/US2005/020795, received May 31, 2006, 5 pages.
Claims, PCT/US2005/020795, 3 pages.
W3C, "XML Fragment Interchange," W3C Working Draft, Jun. 30, 1999, XP-002167090, 17 pages.
Daniele Braga et al., "A Graphical Environment to Query XML Data with Query," Proceedings of the Fourth International Conference on Web Information Systems Engineering (WISE '03), 2003, IEEE, 10 pages.
Diao, Y. et al., "Path Sharing and Predicate Evaluation for High-Performance XML Filtering" XP-002344354 ACM Transactions on Database Systems (2003), pp. 467-516.
Diao, Y. et al., "YFilter: Efficient and Scalable Filtering of XML Documents" IEEE (2002) 2 pages.
Helmer, S. et al., "Optimized Translations of XPath into Algebraic Expressions Parameterized by Programs Containing Navigational Primitives" IEEE (2002) 10 pages.
Notification of Transmittal of the International Search Report and the Written Opinion of the International Searching Authority, or the Declaration for pending international application No. PCT/US2005/020802.
Pending claims for pending international application No. PCT/US2005/020802.
International Searching Authority, "Notification of Transmittal of the International Search Report and the Written Opinion of the International Searching Authority, or the Declaration," PCT/US2005/011763, dated Aug. 1, 2005, 12 pages.
Current Claims, PCT/US2005/011763, 5 pages.
Cooper, Brian F. et al., "A Fast Index for Semistructured Data," Proceeding of the International Conference on Very Large Databases, 2001, XP-002303292, pp. 341-350.
McHugh, Jason, et al. "Indexing Semistructured Data," Stanford Science Department, 1998, XP002248313, pp. 1-21.

Kudrass, Thomas, "Management of XML Documents Without Schema in Relational Database Systems," Information and Software Technology, vol. 44, No. 4, Mar. 31, 2002, XP-004347776, pp. 269-275.

Zhang, Wansong, et al., "An Encoding Scheme for Indexing XML Data," E-Commerce and E-Service, 2004, XP-010697639, pp. 526-529.

Chae, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Noser, Hansrudi et al., "Dynamic 3D Visualization of Database-Defined Tree Structures on the WWW by Using Rewriting Systems," 2000, IEEE, XP-002262516, pp. 247-254.

International Searching Authority, "Notification of the Transmittal of the International Search Report and the Written Opinion of the International Searching Authority, or the Declaration," PCT/US2005/020795, Mailing Date Sep. 27, 2005, 13 pages.

Current Claims, PCT/US2005/020795, 5 pages.

* cited by examiner

```
<Person id="5000">
     <Address>1014 Dietz Avenue</Address>
     <Name>Justin</Name>
     <Address>1000 Stern Lane</Address>
</Person>
```

USING SIBLING-COUNT IN XML INDEXES TO OPTIMIZE SINGLE-PATH QUERIES

CROSS-REFERENCE TO RELATED APPLICATIONS

This application is related to U.S. Pat. No. 7,120,645 issued to Manikutty et al. ("Manikutty"), the entire contents of which are hereby incorporated by reference as if fully set forth herein.

This application is related to U.S. patent application Ser. No. 10/884,311, filed on Jul. 2, 2004, by Chandrasekar et al. ("Chandrasekar"), the entire contents of which are hereby incorporated by reference as if fully set forth herein.

FIELD OF THE INVENTION

The present invention relates to techniques for using eXtensible Markup Language (XML) data in a relational database system, and more specifically, for optimizing queries of information contained in XML documents stored in object-relational databases.

BACKGROUND

Querying and searching information contained in XML documents that are stored within an object-relational database can be especially inefficient given certain queries. XML-aware indices, such as described in Chandrasekar, are available for providing quicker access to XML data in response to XPath queries. However, certain search operations are unable to effectively use XML indices, especially indices following a bottom-up evaluation of the XML document.

An XML index may be composed of a PATH table and a set of secondary indices on the PATH table. The PATH table contains one row per indexed node of an XML document. Each column of the table contains information associated with the indexed nodes, like the XPath or the value of the nodes; secondary indices can be built on the columns. An example of a secondary index is a b-tree index on the value column of the PATH table, also referred to as a value index. The XML index may be accessed when a user submits a query referencing one or more XML documents. The query can be decomposed in the manner described in Manikutty into expressions that use the PATH table. An optimization engine may evaluate an expression using a secondary index in lieu of evaluating directly from the PATH table.

A query that includes a value-based search is an example of a type of query that can be optimized by use of a secondary index. To search for a particular value within the XML document, a user may perform a linear search down the value column of the PATH table, performing as many comparisons as there are rows in the PATH table. Executing a search in this manner requires that each row is read from disk, a costly operation that should be minimized. Building a secondary index, like a b-tree index, on the value column would allow for index-based searching, thereby logarithmically reducing disk accesses for each search.

However, using a b-tree index that passes over most rows of the PATH table when searching for a value means that certain information would no longer be determined during course of a search. For example, if a user needs to ensure that an XPath is unique in an XML document while searching for a value, this can be easily determined when executing a linear search down the rows of a PATH table. On the other hand, it would be impossible to make this determination of a single-path occurrence in the course of a value-based search if most of the rows of the PATH table are passed over by use of a b-tree index.

Based on the foregoing, it would be desirable to be able to use an index, like a b-tree index, with such a single-path query, such that a correct determination could be made about the single-path occurrence while making use of the index optimization.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
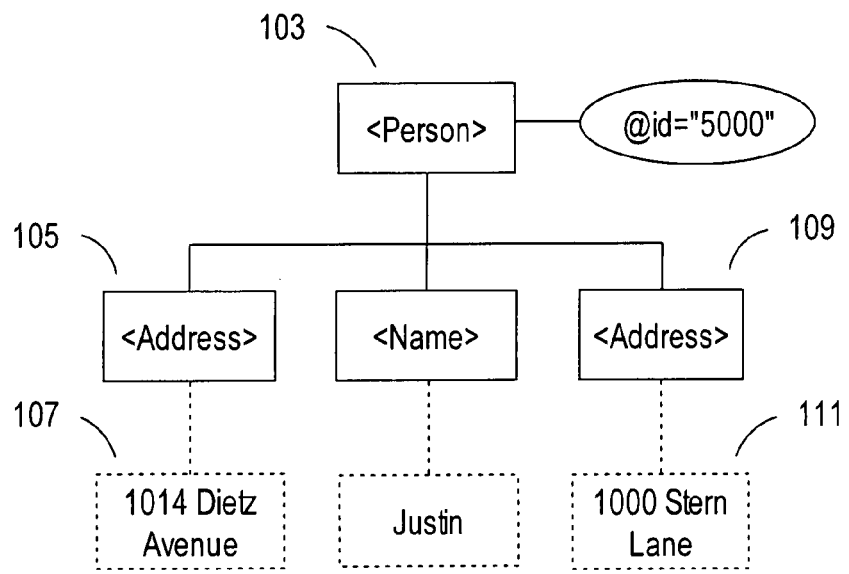
FIG. 1 is a tree diagram representing the XML document "employees.xml."

Techniques for optimizing single-path queries of XML documents are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

For the purpose of explanation, examples shall be given hereinafter with reference to the following XML document and PATH tables shown in TABLE 1 and TABLE 3, respectively:

TABLE 1 employees.xml

```
<Person id="5000">
    <Address>1014 Dietz Avenue</Address>
    <Name>Justin</Name>
    <Address>1000 Stern Lane</Address>
</Person>
```

As shown in TABLE 1, "employees.xml" is an example of an XML document. The techniques described herein are not limited to XML documents having any particular types, structure, or content. The nodes of "employees.xml" are represented as a hierarchical tree in FIG. 1.

For the purposes of explanation, the following examples of PathID-to-Path Mapping (TABLE 2) and the PATH table (TABLE 3) were generated based on the preceding XML document shown in TABLE 1.

TABLE 2

PathID-to-Path Mapping

| PathID | Path |
|---|---|
| 1 | /Person |
| 2 | /Person/@id |
| 3 | /Person/Address |
| 4 | /Person/Name |

TABLE 3

PATH Table

| rowid | rid | PathID | OrderKey | Value | Locator |
|---|---|---|---|---|---|
| 1 | R1 | 1 | 1 | NULL | |
| 2 | R1 | 2 | 1.1 | 5000 | |
| 3 | R1 | 3 | 1.2 | 1014 Dietz Avenue | |
| 4 | R1 | 4 | 1.3 | Justin | |
| 5 | R1 | 3 | 1.4 | 1000 Stern Lane | |

Further details on implementing a PATH table can be found in Chandrasekar. In the following discussion, it will be assumed that "employees.xml" is stored in an object-relational database. The 'rid' column in the PATH table refers to a row in the base structure that is an object-relational table row containing the XML document "employees.xml."

A Single-PATH Query

The following example of a single-path query will be used to illustrate one embodiment of the invention.

```
SELECT *
FROM EMPLOYEES
WHERE extractValue(object-value, '/Person/Address')
LIKE '%Dietz'
```

The Oracle SQL/XML operator "extractValue( )" is one that requires a single-path constraint. The operator takes in an XPath ('/Person/Address') as an argument, and obtains the value of the unique node identified by the XPath. If it is determined that the XPath matches more than one node, then the operator returns an error at run-time. In the above example, the query should return an error because "/Person/Address" is not a unique path in "employees.xml."

To make use of the PATH table, the query will be rewritten by the SQL engine at compile-time according to one of the methods described in Manikutty. More specifically, the expression using the "extractValue( )" operator will be replaced by a subquery referencing the PATH table:

```
SELECT *
FROM EMPLOYEES
WHERE(SELECT value
    FROM path_table
    WHERE pathid=PATHID('/Person/Address')
    AND rid=BASE_TABLE_ROWID)
LIKE '%Dietz'
```

For purposes of optimization, a cost-based optimizer will further transform the query into the following form:

```
SELECT e.*
FROM EMPLOYEES e, path_table p
WHERE p.pathid=PATHID('/Person/Address')
    AND p.rid=e.rowid
    AND p.value LIKE '%Dietz'
```

Using the value index to evaluate the WHERE conditions in the preceding example would return an incorrect result for the original extractValue( ) query because there is no way to determine from the value index whether "/Person/Address" is a unique path in the XML document. Such a value index would be navigated directly to the key containing "% Dietz %." Thus, the WHERE condition would return the row in the PATH table containing "1014 Dietz Avenue" without determining whether "/Person/Address" is a unique path.

According to one embodiment, a resolution to the above problem involves maintaining a sibling count in one of the columns of the PATH table. A sibling count for a node is the total number of nodes in the XML document that have the same node name, are located directly under a given parent, and therefore have identical paths.

The sibling relationship between nodes is shown in FIG. 1, which represents "employees.xml" 101 as a tree. The node "<Address>" 105 containing the text "1014 Dietz Avenue" 107 is a sibling of the node "<Address>" 109 containing the text "1000 Stern Lane" 111. The XPath expression "/Person/Address" refers to two nodes, 105 and 109. Thus, both nodes 105 and 109 are given a sibling count of 2.

The sibling count of each node can be stored in the PATH table with the row for that node as follows:

| rowid | rid | PathID | OrderKey | Value | Locator | Sibling-Count |
|---|---|---|---|---|---|---|
| 1 | R1 | 1 | 1 | NULL | | 1 |
| 2 | R1 | 2 | 1.1 | 5000 | | 1 |
| 3 | R1 | 3 | 1.2 | 1014 Dietz Avenue | | 2 |
| 4 | R1 | 4 | 1.3 | Justin | | 1 |
| 5 | R1 | 3 | 1.4 | 1000 Stern Lane | | 2 |

According to another embodiment, a sibling count can be efficiently built up during XML index creation by simply maintaining a hash table based on the name of the element. The hash table only needs to be maintained at one level and can be discarded when the parent element goes out of scope. In the case of piece-wise updates to the index, the sibling count is kept in sync whenever an element is deleted or inserted.

An additional condition that limits query matches to those nodes having sibling_count=1 would be added to each re-written single-path query having an occurrence constraint as follows:

```
SELECT e.*
FROM EMPLOYEES e, path_table p
WHERE p.pathid=PATHID('/Person/Address')
    AND p.rid=e.rowid
    AND p.sibling_count=1
    AND p.value LIKE '%Dietz'
```

With the p.sibling_count=1 condition in the re-written query, a value index can be used without producing results that are incongruous to the ones produced by the original query. The rewritten query would return the same result as the original query having the "extractValue( )" operator.

Optimizing a Single-PATH Query

Figure 2:
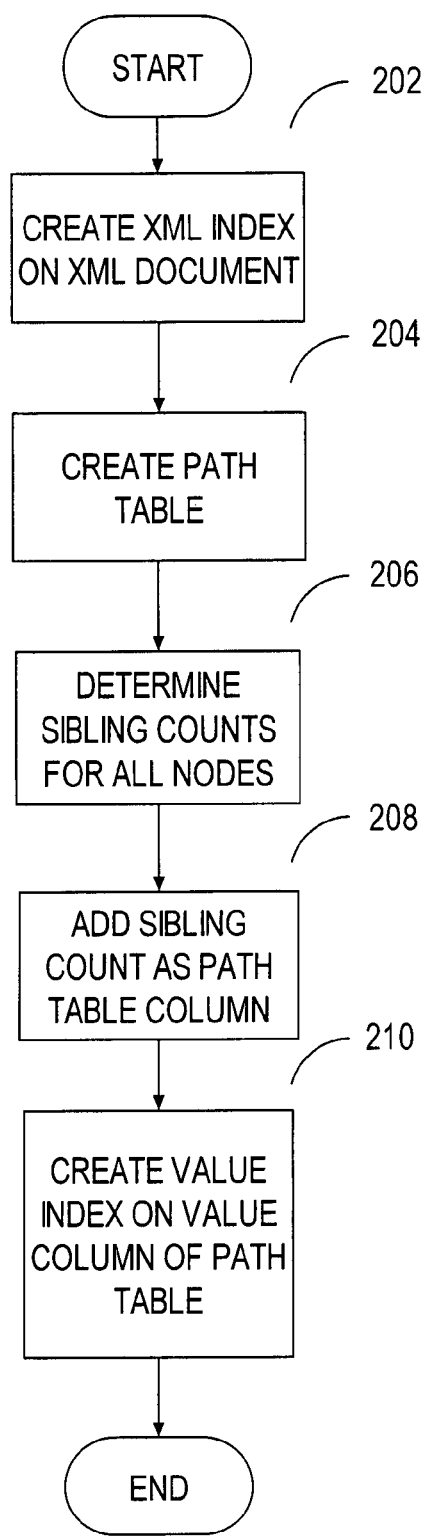
FIG. 2 is a flowchart that represents how the PATH table is extended to maintain a sibling count for all nodes in an XML document, according to one embodiment of the invention.
Figure 3:
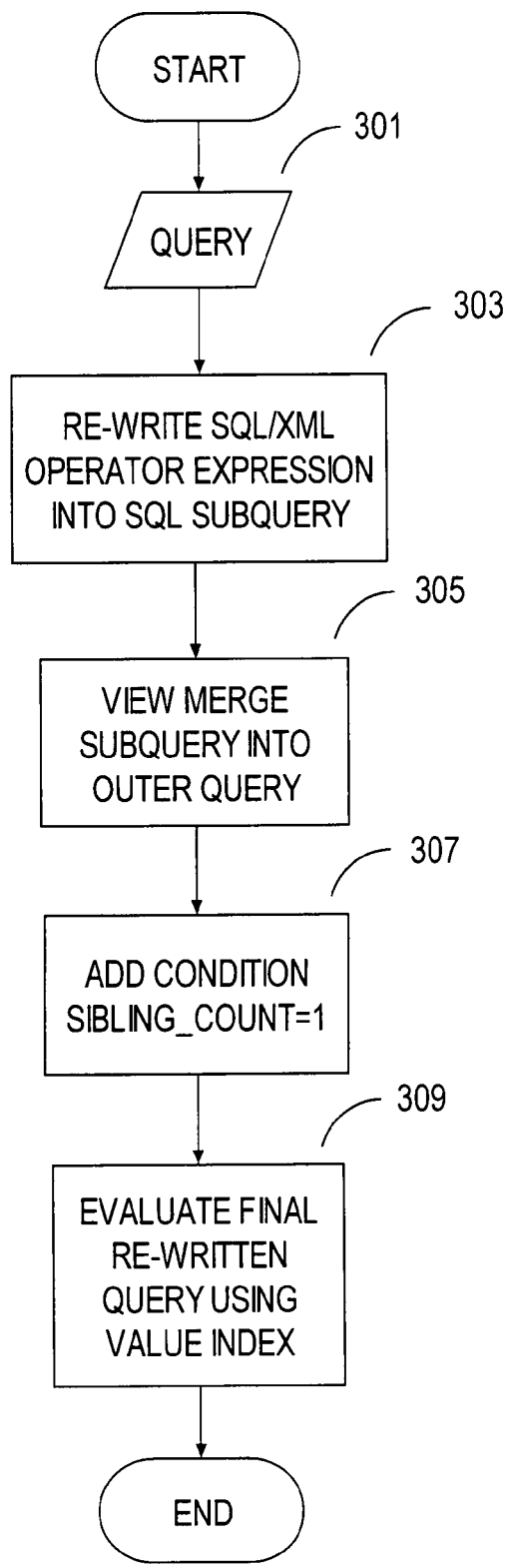
FIG. 3 is a flowchart that represents how a single-path query is optimized by using a sibling count, according to one embodiment of the invention.

FIG. 2 and FIG. 3 together represent how a single-path query is optimized by using a sibling count, according to one embodiment of the invention. FIG. 2 shows the creation of one embodiment of an XML index. An XML index for an XML document is created (step 202). In one embodiment, creation of an XML index includes creation of the relational database structure of a PATH table (step 204). The sibling counts for all nodes are determined (step 206), and the sibling counts are stored in a PATH table column in a corresponding row (step 208). Finally, certain secondary indices, including a b-tree index on the value column of the PATH table, are created (step 210).

In FIG. 3, at step 301, a query on the XML document is received. In this embodiment, the query may have the SQL/XML operator extractvalue( ). At step 303, the expression using the extractValue( ) operator is re-written as a subquery that references the PATH table. At step 305, the subquery is view-merged and re-written into a SQL query form having no subqueries. At step 307, a condition requiring that the sibling_ count=1 is added to the rewritten query. At step 309, the final re-written is evaluated using one of the secondary indices (in particular, a b-tree index), on the value column of the PATH table.

Hardware Overview

Figure 4:
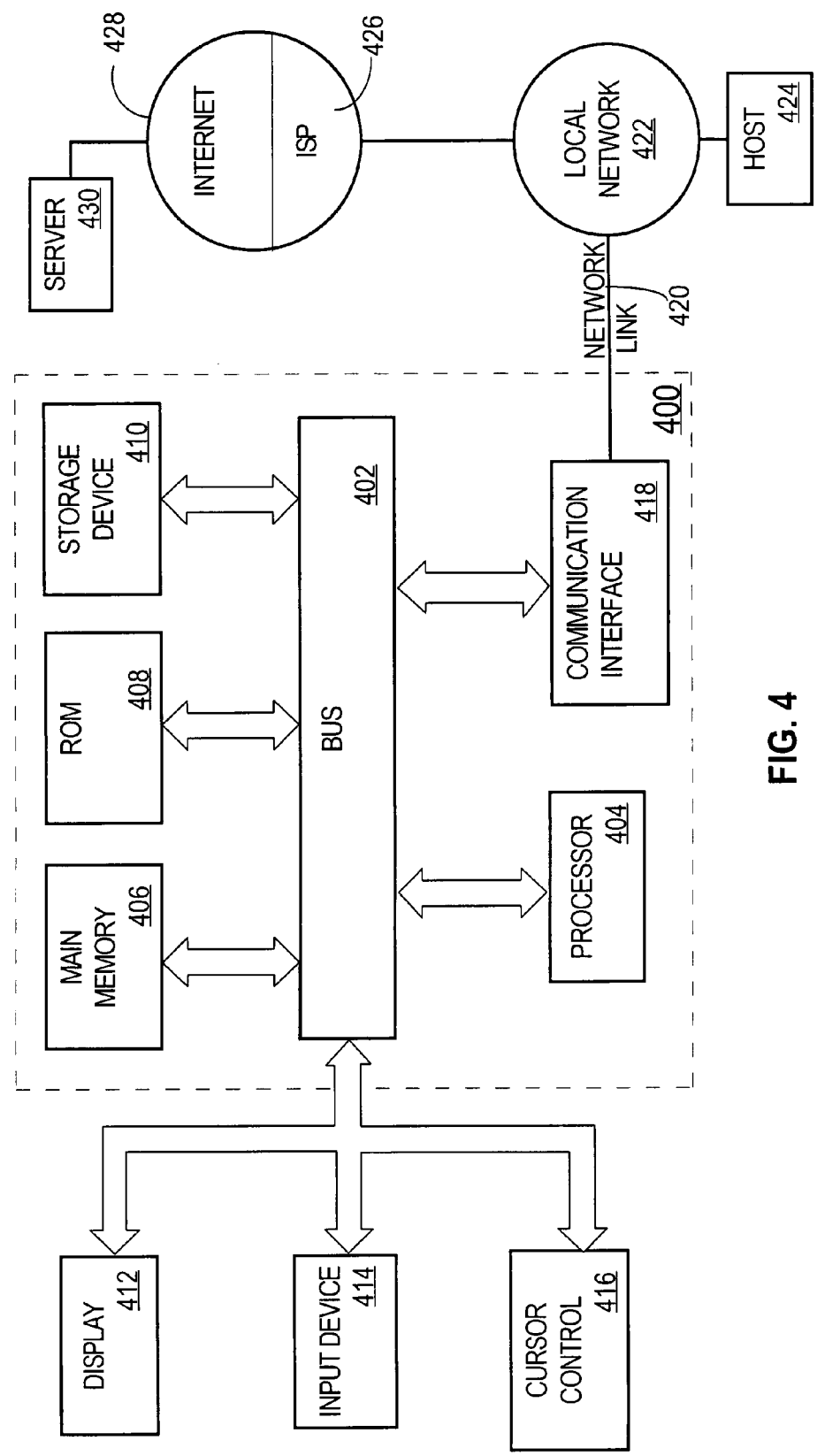
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for optimizing a query, comprising performing a machine-executed operation involving instructions, wherein said instructions are instructions which, when executed by one or more processors, cause the one or more processors to perform certain steps comprising:
    for each node in a set of nodes, creating an entry in an index;
    including, in the entry for each node, stored information that indicates whether there is either one node or more than one node at a path of the each node;
    receiving a first query against the set of nodes, wherein the first query specifies a function that receives a specified path as an argument;
    wherein the function is configured to:
        return a certain value when there is only one node at the specified path; and
        not return the certain value when there is more than one node at the specified path;
    transforming the first query into a second query, wherein the second query:
        does not include the function;
        includes a condition that is based on the stored information that indicates whether there is either one node or more than one node at the specified path; and
        includes operators operating on the index; and
    wherein the second query is configured to return an equivalent result as the first query.

2. The method of claim 1, wherein the function is an SQL/XML operator.

3. The method of claim 2, wherein the SQL/XML operator is extractValue( ), and wherein extractValue( ) is used within the WHERE clause of a SQL query.

4. The method of claim 2, wherein the SQL/XML function in the first query is transformed into relational database operations to create the second query.

5. The method of claim 1, wherein the index is a first index, further comprising:
    including, in each entry in the first index, a node value;
    creating a second index on the node values;
    wherein the second query includes operators operating on the second index.

6. A volatile or non-volatile computer-readable storage medium storing one or more sequences of instructions which, when executed by one or more processors, causes the one or more processors to perform:
    for each node in a set of nodes, creating an entry in an index;
    including, in the entry for each node, stored information that indicates whether there is either one node or more than one node at a path of the each node;
    receiving a first query against the set of nodes, wherein the first query specifies a function that receives a specified path as an argument;
    wherein the function is configured to:
        return a certain value when there is only one node at the specified path; and
        not return the certain value when there is more than one node at the specified path;
    transforming the first query into a second query, wherein the second query:
        does not include the function;
        includes a condition that is based on the stored information that indicates whether there is either one node or more than one node at the specified path; and
        includes operators operating on the index; and
    wherein the second query is configured to return an equivalent result as the first query.

7. The volatile or non-volatile computer-readable storage medium of claim 6, wherein the function is an SQL/XML operator.

8. The volatile or non-volatile computer-readable storage medium of claim 7, wherein the SQL/XML operator is extractValue( ), and wherein extractValue( ) is used within the WHERE clause of a SQL query.

9. The volatile or non-volatile computer-readable storage medium of claim 7, wherein the SQL/XML function in the first query is transformed into relational database operations to create the second query.

10. The volatile or non-volatile computer-readable storage medium of claim 6, wherein the index is a first index, and wherein the one or more sequences of instructions, when executed, further cause the one or more processors to perform:
    including, in each entry in the first index, a node value;
    creating a second index on the node values;
    wherein the second query includes operators operating on the second index.

11. An apparatus for optimizing a query, comprising:
    one or more computing devices configured to perform:
    for each node in a set of nodes, creating an entry in an index;

including, in the entry for each node, stored information that indicates whether there is either one node or more than one node at a path of the each node;

receiving a first query against the set of nodes, wherein the query specifies a function that receives a specified path as an argument;

wherein the function is configured to:
  return a certain value when there is only one node at the specified path; and
  not return the certain value when there is more than one node at the specified path;

transforming the first query into a second query, wherein the second query:
  does not include the function;
  includes a condition that is based on the stored information that indicates whether there is either one node or more than one node at the specified path; and
  includes operators operating on the index; and wherein the second query is configured to return an equivalent result as the first query.

12. The apparatus of claim 11, wherein the function is an SQL/XML operator.

13. The apparatus of claim 12, wherein the SQL/XML operator is extractValue( ), and wherein extractValue( ) is used within the WHERE clause of a SQL query.

14. The apparatus of claim 12, wherein the SQL/XML function in the first query is transformed into relational database operations to create the second query.

15. The apparatus of claim 11, wherein the index is a first index, wherein the one or more computing devices are further configured to perform:

including, in each entry in the first index, a node value;
creating a second index on the node values;
wherein the second query includes operators operating the second index.

16. The method of claim 1, wherein the first query is a SQL query, wherein the function is specified by an extractValue( ) operator, wherein the specified path is an XPath, and wherein transforming the first query into the second query comprises:
  re-writing the SQL query such that a subquery replaces the extractValue( ) operator; and
  including the condition in the SQL query as re-written.

17. The volatile or non-volatile computer-readable storage medium of claim 6, wherein the first query is a SQL query, wherein the function is specified by an extractValue( ) operator, wherein the specified path is an XPath, and wherein the one or more sequences of instructions, when executed, cause the one or more processors to perform transforming the first query into the second query by:
  re-writing the SQL query such that a subquery replaces the extractValue( ) operator; and
  including the condition in the SQL query as re-written.

18. The apparatus of claim 11, wherein the first query is a SQL query, wherein the function is specified by an extractValue( ) operator, wherein the specified path is an XPath, and wherein the one or more computing devices are further configured to perform transforming the first query into the second query by:
  re-writing the SQL query such that a subquery replaces the extractValue( ) operator; and
  including the condition in the SQL query as re-written.

* * * * *

UNITED STATES PATENT AND TRADEMARK OFFICE
CERTIFICATE OF CORRECTION

PATENT NO. : 7,840,609 B2
APPLICATION NO. : 11/888415
DATED : November 23, 2010
INVENTOR(S) : Sivasankaran Chandrasekar et al.

It is certified that error appears in the above-identified patent and that said Letters Patent is hereby corrected as shown below:

On page 2, in column 1, under "U.S. Patent Documents", line 39, delete "Shadmone" and insert -- Shadmon --, therefor.

On page 2, in column 2, under "Other Publications", line 1, delete "GenDBDan" and insert -- GenDB—an --, therefor.

On page 3, in column 1, under "Other Publications", line 26, delete "XQuey" and insert -- XQuery --, therefor.

On page 3, in column 2, under "Other Publications", line 3, delete "Jean-Yes" and insert -- Jean-Yves --, therefor.

On page 3, in column 2, under "Other Publications", line 21, delete "SIGMOND" and insert -- SIGMOD --, therefor.

In column 5, line 20, delete "extractvalue( )." and insert -- extractValue( ). --, therefor.

Signed and Sealed this
Second Day of August, 2011

David J. Kappos
*Director of the United States Patent and Trademark Office*